United States Patent [19]
Poggie

[11] 3,872,952
[45] Mar. 25, 1975

[54] ANTI-SKID APPARATUS

[76] Inventor: Joseph L. Poggie, 815 Iris Ln., Vero Beach, Fla. 32960

[22] Filed: Oct. 9, 1973

[21] Appl. No.: 404,398

[52] U.S. Cl. .................... 188/181 T, 303/21 CH
[51] Int. Cl. .................................. B60t 8/06
[58] Field of Search ............ 188/180, 181 A, 181 C, 188/181 T, 181 R; 303/21 CH, 61

[56] References Cited
UNITED STATES PATENTS

| | | | |
|---|---|---|---|
| 2,781,871 | 2/1957 | Alterkruse | 188/181 T |
| 3,711,162 | 1/1973 | Steinbrenner et al. | 188/181 T |
| 3,716,118 | 2/1973 | Gelhaar | 118/181 T |
| 3,724,610 | 4/1973 | Caero | 188/181 T |

Primary Examiner—Duane A. Reger
Attorney, Agent, or Firm—Duckworth, Hobby & Allen

[57] ABSTRACT

A vehicle wheel anti-skid apparatus is provided for sensing the torque applied to a vehicle wheel by the road and using the torque to power the brake thereby limiting the brake capacity so that it cannot exceed the force capacity of the wheel road contact of the anti skid system. The system also uses changes in wheel torque to operate a servo valve which pulses the brake in special road situations and to compensate for the low compressibility of the hydraulic fluid so that the servo valve may operate quickly and freely.

12 Claims, 4 Drawing Figures

ANTI-SKID APPARATUS

BACKGROUND OF THE INVENTION

The present invention relates to anti skid devices and especially to an anti skid brake for vehicle wheels which utilizes the torque to power the wheel brake so that the braking force cannot exceed the force capacity of the wheel road contact.

It has been known for some time that under most road conditions, skidding does not occur suddenly as a result of an instantaneous switch from the coefficient of rolling friction to the coefficient of sliding friction at the wheel road contact and a corresponding switch in the brake from a coeffecent of sliding friction to a coefficient of static friction. The change from rolling contact of skidding is a gradual but rapid transition where the coefficient of friction varies with the time slippage while the brake switches from sliding friction to static friction at the instant the wheel reahes 100% slippage.

A great many power anti skid devices sense wheel rotation vehicle acceleration or brake pressure to indicate a skid condition, even though some prior art devices utilize the measuring of torque to indicate slippage. Many of these systems use an electronic circuit to pump or pulse the brake pressure causing the tire-road contact to alternate between skidding and near skidding conditions. These prior art systems improve braking but have a number of disadvantages including not providing optimum stopping conditions but instead operate in the high percentage skid area and thus prevent primarily sustaining full skids. Their effectiveness is influenced by road conditions since any given wheel rotation rate, vehicle acceleration or brake pressure could occur at any point in the range of skid, and finally, the systems are complicated by complex electronic hydraulic circuitry resulting in high cost of installation and maintenance.

There are also a number of anit skid devices which sense torque and use this to operate servo valves, but these similarly have some disadvantages such as the brake pressure not being limited but merely controlled, thus allowing for possible skids. They also do not control the optimum stopping point but rather prevent sustained skids.

The present invention, on the other hand, relates to a combination of devices which are directed toward preventing skidding of a vehicle on any road by adapting the braking force to the existing road wheel friction condition. Thus the invention will sense the torque applied by the road to the wheel and use this torque to power the brake, thus providing a limit on the braking capacity which is dependent on the existing road conditions.

SUMMARY OF THE INVENTION

An anti skid brake mechanism is provided having a fluid drive system for applying fluid pressure to a brake. A torque measuring pilot brake is provided for actuation by the fluid drive system for sensing a torque created by the road wheel contact. A converter system is provided for converting the torque measured by the pilot brake into hydraulic pressure. The main brake driving system is driven by hyraulic pressure from the converter.

BRIEF DESCRIPTION OF THE DRAWING

Other objects, features and advantages of the present invention will be apparent from the description and the drawings in which.

DESCRIPTION OF THE PREFERRED EMBODIMENT

Figure 1:
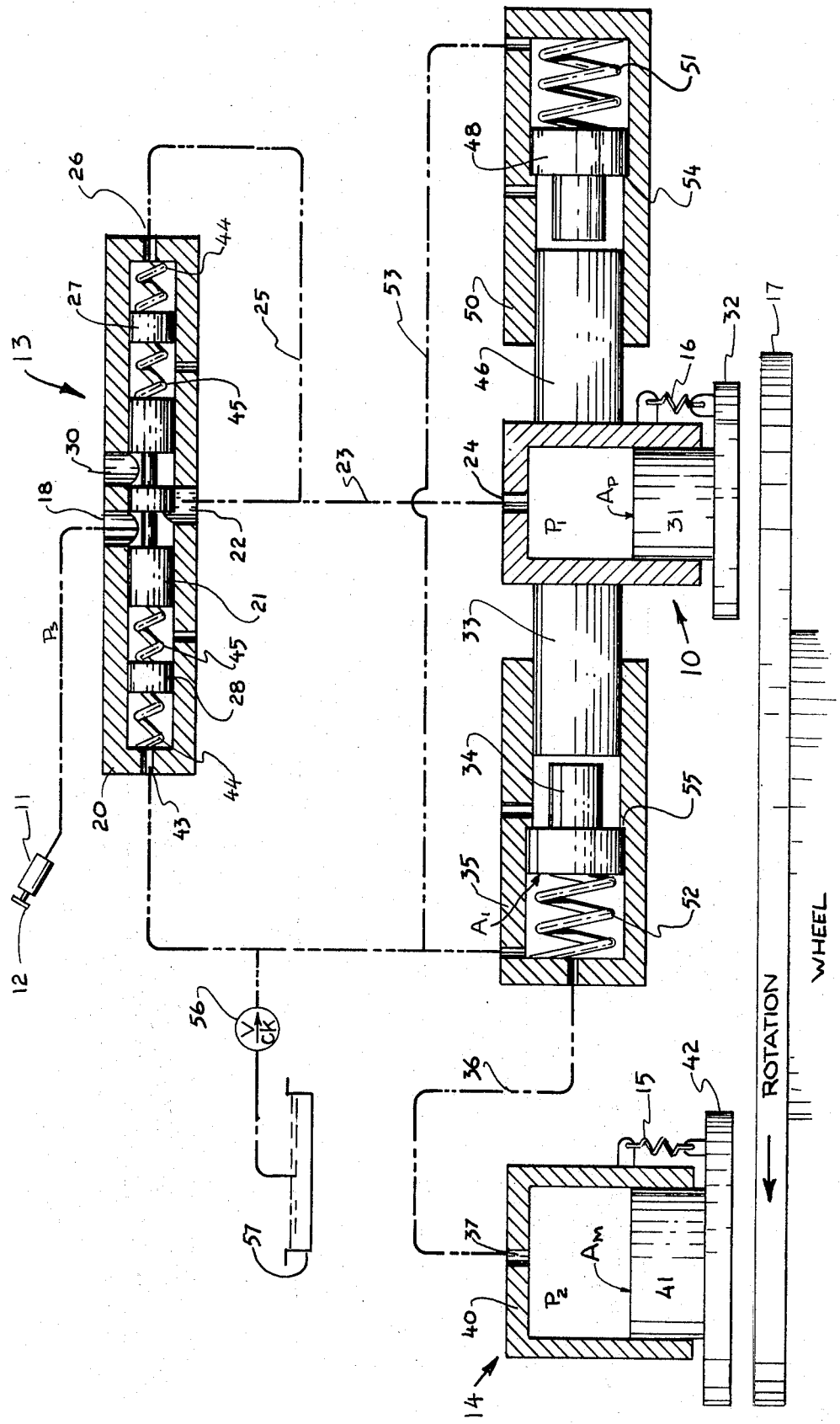
FIG. 1 is a schematic sectional view of a preferred embodiment of the present invention having a combination of pilot brake, main brake and servo valve.

Referring now to the drawings, there are several embodiments of an anti-skid device illustrated in sectional schematic views. FIG. 1 consists of broadly a pilot brake 10 which is operated by hydraulic or pneumatic pressure generated at the driver's brake cylinder 11 by the driver's brake pedal force applied to the brake pedal 12. A specially designed spring centered servo valve 13 provides sufficient brake response to rapidly changing road conditions, while a conventional main brake 14 is operated by the pilot brake 10, retracting springs 15 on the main brake 14 and 16 on the pilot brake 10 are utilized to retract the brakes. In the embodiment of FIG. 1 the brake pedal 12 which drives a specially mounted pilot brake 10 which is designed to sense the torque created by the road wheel contact and convert that torque into hydraulic pressure. The hydraulic pressure generated by the pilot brake 10 is then used to power the main brake 14, thus creating a braking effect as proportioned to the force applied to the brake pedal, yet is limited to the capability of the road to apply torque to the wheel. Therefore, regardless of the pressure exerted on the brake pedal 12 by the driver, the brake torque capacity is always exactly equal to the torque applied to the wheel and brake disc 17 attached to the wheel by the deceleration of the vehicle and is limited to the maximum torque that the road conditions allow the road to apply to the wheel thus resulting in optimum braking.

In FIG. 1, when the driver presses on the brake pedal 12, a control of pressure $P_s$ is generated in the master cylinder 11, and is transmitted into port 18 of the servo valve housing 20, through the passage provided by the spring centered spool 21, and out of port 22, also in the servo valve housing 20.

From port 22, the fluid control pressure $P_s$ is communicated simultaneously through line 23 to pilot brake 10, inlet port 24 and also through passage 25 to servo valve 13 control end port 26 where in both cases it appears as control pressure $P_1$.

It will be shown later that for this condition the force generated by $P_1$ on a free piston 27 is balanced by a force generated by $P_2$ on free piston 28 at the other end of the servo valve 13. The net result being that the servo spool 21 is centered allowing the fluid communication of ports 18 and 22 while blocking off a return port 30.

The pilot pressure $P_1$ is communicated through pilot brake 10 inlet port 24 to the area $A_P$ of the pilot brake 10 piston 31 forcing the pilot brake 10 shoe 32 into contact with the brake disc 17 which is fixed to, and rotates with, the wheel.

A friction force $F_1$ is generated when the brake disc 17 slides across the pilot brake shoe 32 such that $$F_1 = P_1 A_P \mu_1, \text{ where } \mu_1$$

is the coefficient of sliding friction between the shoe 32 and the disc 17.

The friction force $F_1$ is transmitted by the power piston 33 to the transfer piston 34 both of which slide within the transfer cylinder 35 which in turn is firmly fixed to the axle or wheel mounting means or, if desired, to the main brake shoe. The force $F_1$ acting through the transfer piston 34 against the fluid in the end of the transfer cylinder 35, creates a pressure $P_2$ such that $$P_2 = F_1/A_1$$

The pressure $P_2$ is transmitted through passage 36 to inlet port 37 of the main brake 14 cylinder 40 and acts against the area $A_m$ of the main brake piston 41 forcing the main brake shoe 42 against the moving disc 17, thus generating a second and larger braking force $F_2$. The sum of $F_1$ and $F_2$ create a braking torque $T_B$ which opposes the rotation of the disc 17, and the wheel to which it is attached such that $$T_B = (F_1 = F_2) R_1$$

where $R_1$ is the effective radius of the brake and $F_2 = P_2 A_M \mu_2$.

$$F_2 = P_1 A_P \mu_1 \mu_2 (A_m/A_1)$$

and the total breaking torque $T_B$ is $$T_B = P_1 A_P R_1 (\mu_1 + \mu_2 [A_m/A_1])$$

Figure 2:
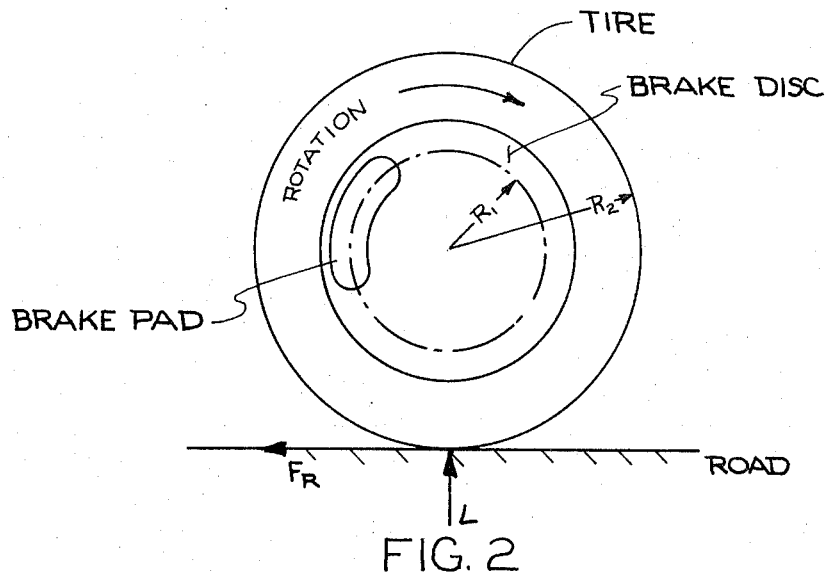
FIG. 2 is a force diagram of wheel-road brake relationship.

Referring to FIG. 2, the torque exerted by the brake must always be exactly equal to the torque exerted by the road in contact with the tire which can be called the wheel torque $T_W$ where:

$$T_W = F_R R_2$$

where $R_2$ is the outside radius of the wheel and $F_R$ is the tangential force exerted on the wheel by surface of the road.

By the basic physical relationship that force is equal to mass times acceleration.

$$F_R = L\, a/g$$

where $L$ is the weight of the body supported by the wheel, $a$ is the deceleration of the vehicle caused by the application of the brake, and $g$ is the universal gravitational constant. The wheel torque $T_W$ can also be expressed as follows:

$$T_W = (L\, a/g) R_2.$$

Since the brake torque $T_B$ must always be equal to the wheel torque combining equations results in:

$$a = P_1 A_P R_1 g/L\, R_2\, \mu_1 + \mu_2 [A_M/A_1]$$

In other words, the deceleration $a$ of the vehicle on any given road surface is a function of only one variable which is the control pressure $P_s$ (or $P_1$) as long as the wheel-road contact is of sufficient friction force capacity to sustain the acceleration.

Under certain conditions it is possible that the road conditions may change very rapidly, from a very high coefficient of friction to a very low coefficient of friction. This is the one condition for which the pilot brake and main brake alone, cannot compensate. An example of such a situation would be the case where the vehicle was coming to a stop on a dry pavement and suddenly hit a wet or icy spot. My invention provides for this situation by including a specially designed spring centered servo valve 13 which operated in the following manner having reference to FIG. 1.

With the vehicle decelerating rapidly on a dry pavement, the servo spool 21 is approximately centered. The force generated by the fluid pressure $P_1$ at port 26 on the free piston 27 is equal to the force generated by the fluid pressure $P_2$ at port 43 on free piston 28. These forces, along with the forces of springs 44 serve to position the servo valve.

When the wheels switch suddenly from the high road friction coefficient to the low road friction coefficient, any instinctive change in brake pedal 12 force, by the driver, will activate the servo valve 13. If the driver increases brake pedal force, increasing $P_1$ to the pilot brake 10, no further increase in $F_1$ and $P_2$ will be generated since the brake capability will already have exceeded the tire-road force capability. This means that $P_1$ will increase while $P_2$ will not increase, causing a difference in force that will move the servo valve 13 spool 21 off center closing off the control pressure $P_2$ from the brake pedal 12 and at the same time opening the pilot pressure to port 30. In hydraulic operated systems, port 30 is connected to a reservoir, but in a pneumatic operated system port 30 is vented to atmosphere, in either case the release of pilot pressure $P_1$ immediately disengages pilot brake shoe 32 from the disc 17 releasing force $F_1$ and reducing main brake pressure $P_2$. This brake release is instantly followed by a reapplication of the brakes due to the re-equalization of the forces on the servo spool 21 and its resultant return to center. If at any time, the driver exerts more force than is necessary to effect an optimum stop, the servo valve 13 will automatically pulse the brake system about the optimum stopping point.

If the driver had released the brake upon hitting the icy spot and then reapplied it, the brake also would readjust to the new road condition.

The two inner springs 45, in FIG. 1, compensate for the incompressibility of the hydraulic fluid by changing the combined length of the spool 21 and free piston 27 and 28 assembly. Assume an increase in pressure $P_1$ at port 26, if there were no free piston 28 and spring 45, the spool 21 could not move toward port 43 due to the incompressibility of the fluid at port 43. The presence of the free pistons 27 and 28 and the springs 45 allow the spool 21 to move in either direction just as if the fluid were compressible. The volumes occupied by the springs 45 are vented to atmosphere or to a reservoir to prevent hang ups due to possible loss of air or hydraulic fluid. The servo valve 13 shown in FIG. 1 will operate with hydraulic or pneumatic control fluid at port 26 and hydraulic fluid at port 43.

The free piston 27 and its accompanying spring 45 can be eliminated when pneumatic fluid is used at port 26 and hydraulic fluid is used at port 43.

Provisions are made for applying the brakes when the vehicle is in reverse, by the use of another power piston 46, transfer piston 48, transfer cylinder 50 and centering spring 51 which are similar or identical to power piston 33, transfer piston 34, transfer cylinder 35 and spring 52. The two cavities formed by transfer cylinders 35 and 50 are connected together by fluid passage 53 so that the movement of the pilot brake 10 in either direction will generate hydraulic pressure to power the main brake 14. Transfer piston 48 is prevented from following the power piston 46 when the brake is applied with the vehicle moving in the forward direction by a shoulder 54. In a like manner, transfer piston 34 cannot follow power piston 33 beyond shoulder 55.

The main brake cylinder 40 is replenished to compensate for any possible leakage losses, by the addition of a check valve 56 which allows fluid to flow from the reservoir to the cylinder 40 when the brake is not applied and prevents reverse flow when the brake is applied.

An important feature of this servo valve is that any cycling that occurs takes place about the optimum 20% slip point instead of the maximum skid point as do existing anti-skid devices.

Figure 3:
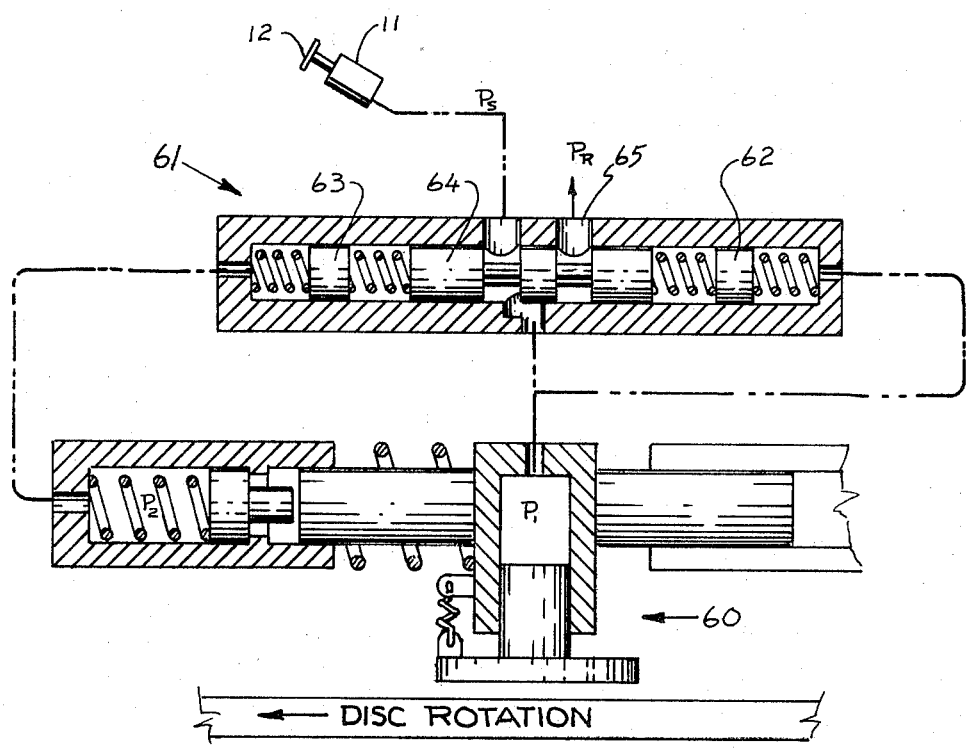
FIG. 3 is a schematic sectional view of a combination of a floating main brake and servo valve.

An alternate embodiment of the present anti-skid devices is illustrated in FIG. 3. In this case there is no pilot brake but instead the torque sensing is accomplished by a floating, spring mounted main brake 60. The servo valve 61, which is identical to that shown in FIG. 1, is used to compare the control pressure $P_1$ applied to the main brake, to the pressure $P_2$ generated by the torque. As $P_1$ is increased, as a result of increased brake pedal force, the torque pressure $P_2$ is also increased in proportion to $P_1$. The forces generated by $P_1$ and $P_2$ against the free pistons 62 and 63 in the servo valve 61, are equal and cause the spool 64 to remain centered.

As $P_1$ increases and the optimum stopping point is approached, $P_2$ will follow $P_1$. Once the optimum stopping point is reached, however, $P_2$ can no longer follow $P_1$ since $P_1 A_M \mu$ exceeds the torque that the road-wheel contact can maintain. Thus the force of $P_1$ against free piston 62 will exceed that of $P_2$ against free piston 63 with the result that the servo spool 64 will be forced off center. The supply pressure $P_S$ will be blocked at port while the brake pressure $P_1$ will be connected to the return port 65. $P_1$ will then drop below $P_2$ releasing the brake, rebalancing the servo valve 61 and reapplying the brake. This process will continue resulting in a continuous pulsing of the brake about the optimum braking point and preventing the brake from leaving the optimum conditions rather than just preventing sustained skidding as is presently done.

Braking in reverse and fluid replenishing is performed in the same manner in connection with FIG. 1.

Figure 4:
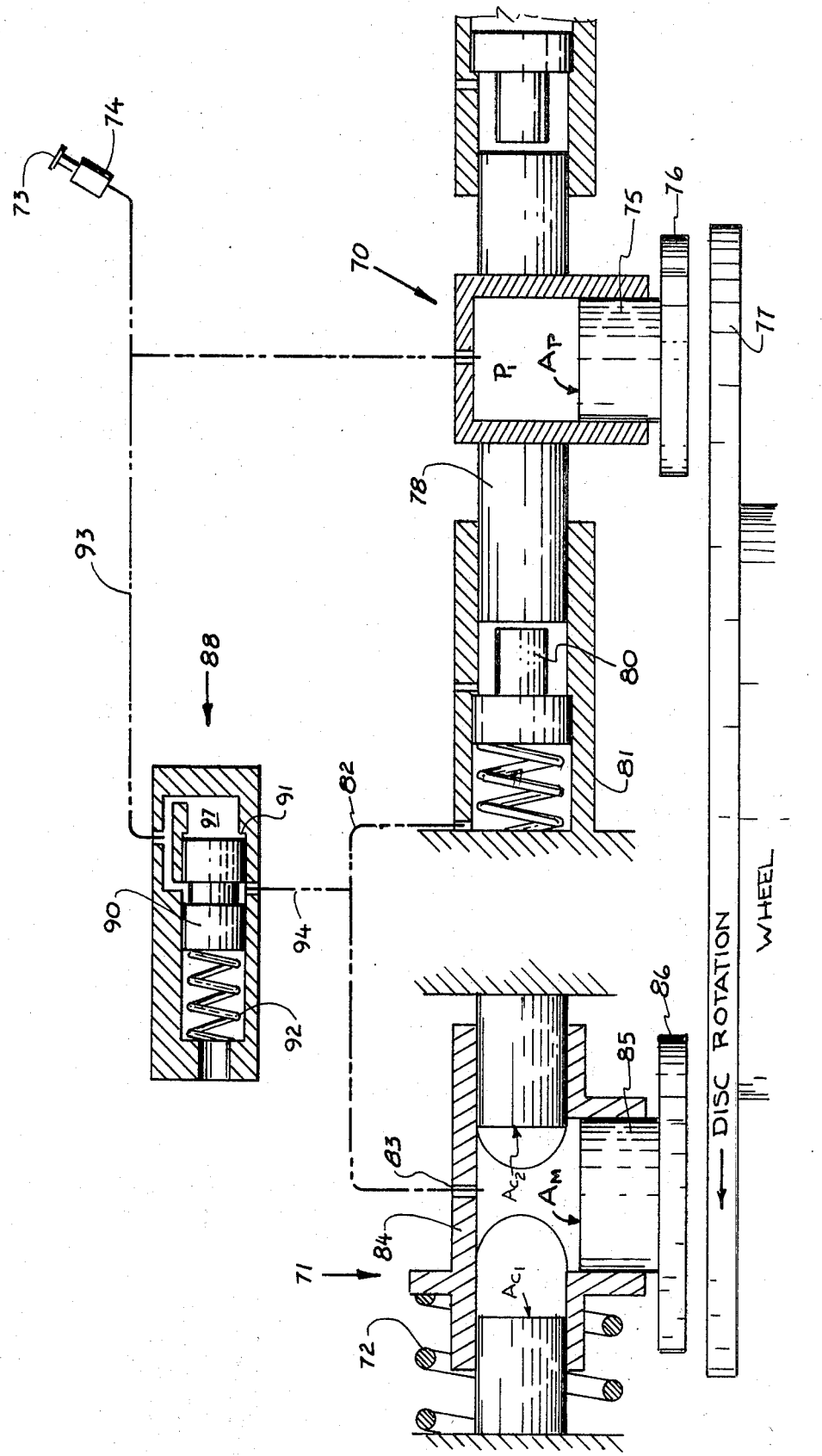
FIG. 4 is a schematic, sectional view of a combination pilot brake, floating main brake, compensating piston and replenishing valve.

Turning now to FIG. 4, an anti-skid system is shown which utilizes a pilot brake 70 and the floating main brake 71. This system uses the pilot brake 70 to power and limit the main brake 71 during stops made on roads where the friction coefficient is constant or increasing. Should the vehicle hit a wet or icy spot or very low friction coefficient, the wheels will momentarily lock in a 100 percent skid. At the same instant the spring force from spring 72 on the main brake will instantly rotate the wheel in the direction opposite to the original direction thus releasing the pressure and unlocking the wheel. As soon as the wheel turns again as a result of road friction, the brake will automatcially reapply and readjust to operate at the optimum point of the new road conditions. When the driver presses on a brake pedal, a control pressure $P_1$ is generated in the master cylinder 74 and transmitted to the pilot brake cylinder 70 and the area $A_p$ of the pilot brake piston 75 forcing the pilot brake shoe 76 into contact with the brake disc 77 which is fixed to, and rotates with the wheel.

A friction force $F_1$ is generated when the brake disc 77 slides across the pilot brake shoe 76 such that $$F_1 = P_1 A_p \mu_1$$

The friction force $F_1$ is transmitted by the power piston 78 to the transfer piston 80 both of which slide within the transfer cylinder 81. The transfer cylinder 81 is firmly fixed to the axle or wheel mounting means or if desired to the main brake shoe.

The force $F_1$ acting through the transfer piston 80 against the fluid in the end of the transfer cylinder 81 creates a pressure such that $$P_2 = F_1/A_1.$$

The pressure $P_2$ is transmitted through passage 82 to the inlet port 83 of the main brake cylinder 84 and acts against the area $A_M$ of the main piston 85 forcing the main brake shoe 86 against the moving disc 77 generating a second and larger braking force $F_2$. The sum of $F_1$ and $F_2$ create a braking torque $T_B$ which opposes the rotation of the disc and wheel such that $$T_B = (F_1 + F_2)R_1$$

where $R_1$ is the effective radius of the brake and $F_2 = P_2 A_M \mu_2$ $$F_2 = P_1 A_p \mu_1 \mu_2 (A_M/A_1)$$

Then the total braking torque $$T_B = P_1 A_p R_1 (\mu_1 + \mu_2 A_M/A_1)$$

The total brake torque $T_B$ transmitted to the chassis by the main sprint 72 which is compressed in proportion to the forces $F_1$ and $F_2$ which are of course proportional to the friction force $F_R$ of the road-tire contact which is equal to $L \mu_R$.

When the brake is applied on any surface, the brake torque $T_B$ is proportional only to $P_1$ since all other factors in equation are constant. However, the torque $T_B$ is always equal to and limited by the road torque which is equal to $\mu_R L R_2$. As long as $\mu_R$ does not decrease appreciably, it is not possible for the wheel to skid. If a sudden, large decrease in $\mu_R$ is experienced, such as entering a wet spot or icy spot with the brakes applied, the brake will momentarily skid. The skid results in a decrease in the road torque $T_R$ and thus also in the brake torque $T_B$ and the forces $F_1$ and $F_2$. Since $F_1$ and $F_2$, which were acting to compress the main spring 72, are not partially relieved, spring 72 expands moving the entire main brake assembly 71 and disc 77 in a direction opposite to the original. Depending on the relationship between the compensator areas Ac1 and Ac2 the pressure in the main brake 71 will be reduced unlocking the brake. As soon as the brake is unlocked, the disc 77 and wheel will start to turn as a result of the new road force $F_R$ which now is made up of $L R_2 \mu_R$ where $\mu_R$ is a lower value than the original. The brake immediately reapplies itself according to the formula $$T_B = P_1 A_p R_1 (\mu_1 + \mu_2 Am/A_1)$$

except now the limiting $T_R$ is a much lower value and will prevent skidding on the new, low $\mu$ road surface.

The servo valve such as 13 of FIG. 1 or 61 of FIG. 3 can be added to this configuration if desired without departing from the spirit and scope of the invention.

FIG. 4 also illustrates an automatic fluid replenishing valve 88 for use on an all hydraulic system. When no brake pressure exists, the replenishing valve spool 90 is held against shoulder 91 by spring 92. The entrapped fluid in the main brake cylinder 84 is thus connected to the master cylinder 74 by means of passages 93, 82, 94 and the open spool 90. When the brake is applied, fluid pressure in cavity 97 forces spool 90 to close off the supply of fluid to the main brake cylinder 84 before the main brake shoe 86 contacts the disc 77. This is accomplished by proper sizing of the replenishing valve spring 92 and the main brake retracting spring (not illustrated). With the spool 90 closed, the brake operated in its design condition.

The present invention is not to be construed as limited to the particular forms disclosed herein since these are to be regarded as illustrative rather than restrictive.

I claim:

1. An anti-skid brake system comprising in combination:
   a. brake pedal means for actuation by an operator;
   b. master cylinder means operatively connected to said brake pedal means for actuation of a brake system responsive to actuation of said brake pedal means;
   c. a pilot brake assembly operatively connected to said master cylinder means for actuation by said master cylinder means to apply frictional braking force to resist a rotating wheel, said pilot brake assembly having at least a portion thereof movable responsive to said rotating wheel when said pilot brake is resisting the rotation of said wheel;
   d. main brake assembly operatively connected to said pilot brake assembly for actuation thereby by the movement of said pilot brake responsive to the actuation of said pilot brake to resist the rotation of said wheel whereby said main brake assembly is responsive to force from said rotating wheel when said pilot brake is actuated to resist the rotation of said wheel; and
   e. said pilot brake assembly having at least one slidable piston connected thereto and slidable in a cylinder responsive to the movement of at least a portion of said pilot brake assembly to generate fluid pressure responsive to the sliding piston to drive said main brake assembly and said pilot assembly having at least one brake pad for actuation against a rotatable brake disc attached to said rotating wheel for rotating with said wheel and said piston being actuated by the movement of said pilot brake braking pad engaging said rotating disc.

2. An anti-skid brake system in accordance with claim 1 in which a servo valve is connected between said master cylinder means and said pilot brake assembly for pulsing said pilot brake assembly under predetermined conditions.

3. The apparatus in accordance with claim 2 in which said servo valve has a housing having at least two ports therethrough and enclosing a slidable spool therein to control fluid flow through said valve ports; a pair of slidable pistons one located on either side of said spool in said housing, and each located between a pair of compressible members between one end of said housing and one end of said spool, each said slidable piston beinf actuated to move said spool to partially open or close at least one said port responsive to said compressible members and to the feed back of fluid from said power brake assembly.

4. The apparatus in accordance with claim 1 in which there are a pair of pistons each slidable in a cylinder responsive to braking said rotating brake disc attached to a rotating wheel, one said slidable piston being actuated when a portion of said pilot brake assembly moves in one direction and the other said slidable piston being actuated when said pilot brake assembly is moved in the opposite direction responsive to the braking of said rotating wheel brake disc.

5. The apparatus in accordance with claim 4 in which each said cylinder has a free slidable piston located between said piston therein and an end wall of said piston, and a centering spring located between said free slidable piston and said end wall of each said cylinder and means to limit the motion of said free sliding piston in each cylinder to prevent said free sliding piston from following said piston the full length of its stroke.

6. A vehicle wheel anti-skid braking method comprising the steps of sensing the torque applied to the road to a vehicle wheel and braking the wheel with the sensed torque; said step of sensing of the torque including applying a pilot brake pad against a wheel brake disc; and generating a force by the movement of the pilot brake responsive to the pilot brake pad engagement with the movement brake disc and applying the generated brake force of said pilot brake to the main brake thereby braking said wheel brake disc with said main brake responsive to said generated force from said movement of said pilot brake.

7. The method in accordance with claim 6 including the step of pulsing said pilot brake to pulse said main brake.

8. An anti-skid brake system comprising in combination:
   a. fluid actuation means for generating and applying fluid pressure to a brake system;
   b. main brake means for braking a rotating brake disc attached to a rotatable wheel;
   c. a pilot brake means actuated by and operatively coupled to said fluid actuation means to drive at least one pilot brake pad against a rotating brake disc when actuated by said fluid actuation means; and
   d. said pilot brake means including coupling means operatively coupling said rotating brake disc to said main brake means when said pilot brake pad is applied against said rotating brake disc for braking said rotating brake disc, whereby the main brake is actuated by force from a rotatable wheel.

9. An anti-skid brake system comprising in combination:
   a. a rotatable wheel;
   b. a rotatable disc attached to said rotatable wheel for rotation therewith;
   c. a fluid actuated first brake means having a fluid driven brake shoe and brake pad thereon for engaging said rotatable disc when actuated;
   d. fluid pressure generating means operatively connected to said first brake means for generating fluid pressure when said first brake means is actuated against a rotating disc by the movement of a portion of said first brake means;
   e. a brake fluid actuated second brake means having a fluid driven brake shoe and brake pads and being operatively connected to said first brake means fluid pressure generating means for actuation thereby, whereby said second brake means is actuated only in accordance with the force applied against said first brake means by said rotatable disc; and f. said first brake means having a pilot brake cylinder for actuating said fluid pressure generating means having a pair of pistons riding in cylinders, said pistons being connected to said first brake means for actuation by the movement of said first brake means responsive to the engagement of said first brake means with a rotating rotatable disc, one cylinder being actuated for each direction of rotation of said rotatable disc.

10. An anti-skid brake system in accordance with claim 9 in which said brake system has a master cylinder actuatable by an operator and operatively connected to said first brake means and a servo valve is connected between said master brake cylinder and said first brake means for pulsating said first brake means under predetermined conditions.

11. The apparatus in accordance with claim 10 in which said second brake means provides the main braking force to frictionally resist the rotation of said rotatable disc and is actuated by the fluid pressure generating means pistons being actuated by the first brake means and includes a brake cylinder actuating brake pad against said rotating disc.

12. The apparatus in accordance with claim 9 in which said fluid pressure generating means pistons move substantially tangential to said brake disc.

* * * * *